A. P. GUBRUD.
CORN HARVESTING AND HUSKING MACHINE.
APPLICATION FILED FEB. 29, 1908.
1,056,665.
Patented Mar. 18, 1913.
6 SHEETS—SHEET 1.
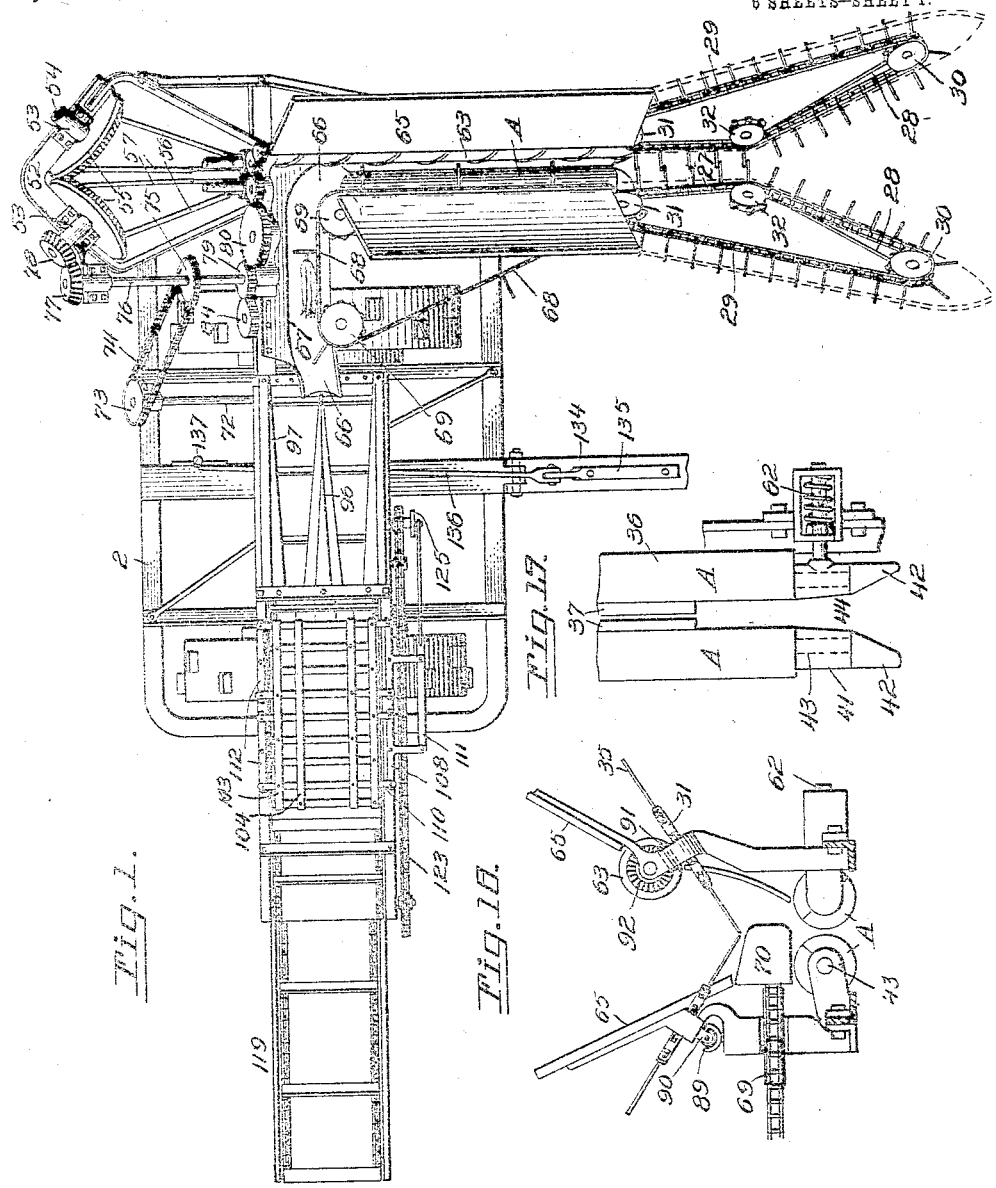
Inventor
Adolph P. Gubrud.
Witnesses
F. C. Gibson.
A. Griffith.
By Victor J. Evans
Attorney

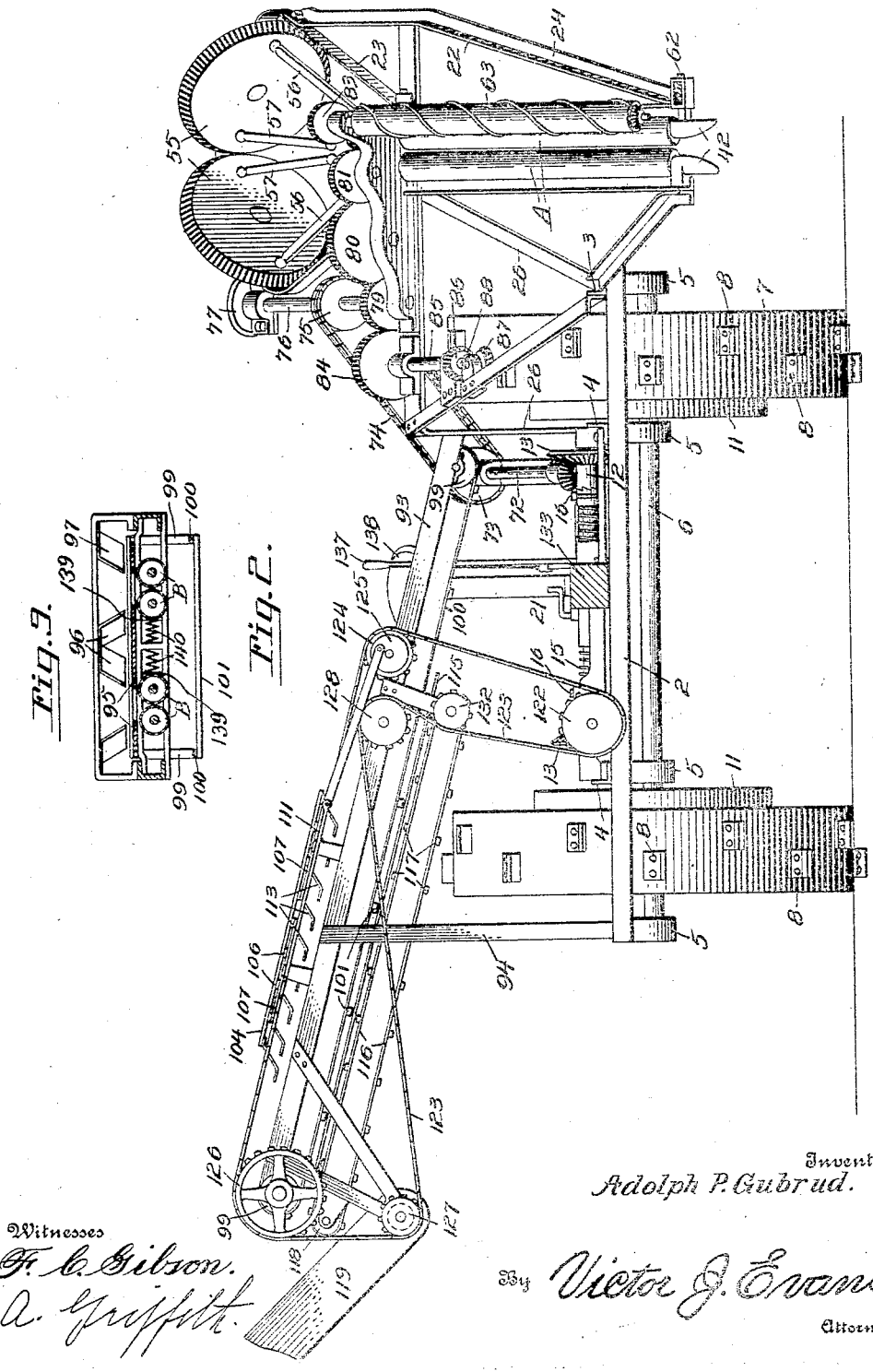

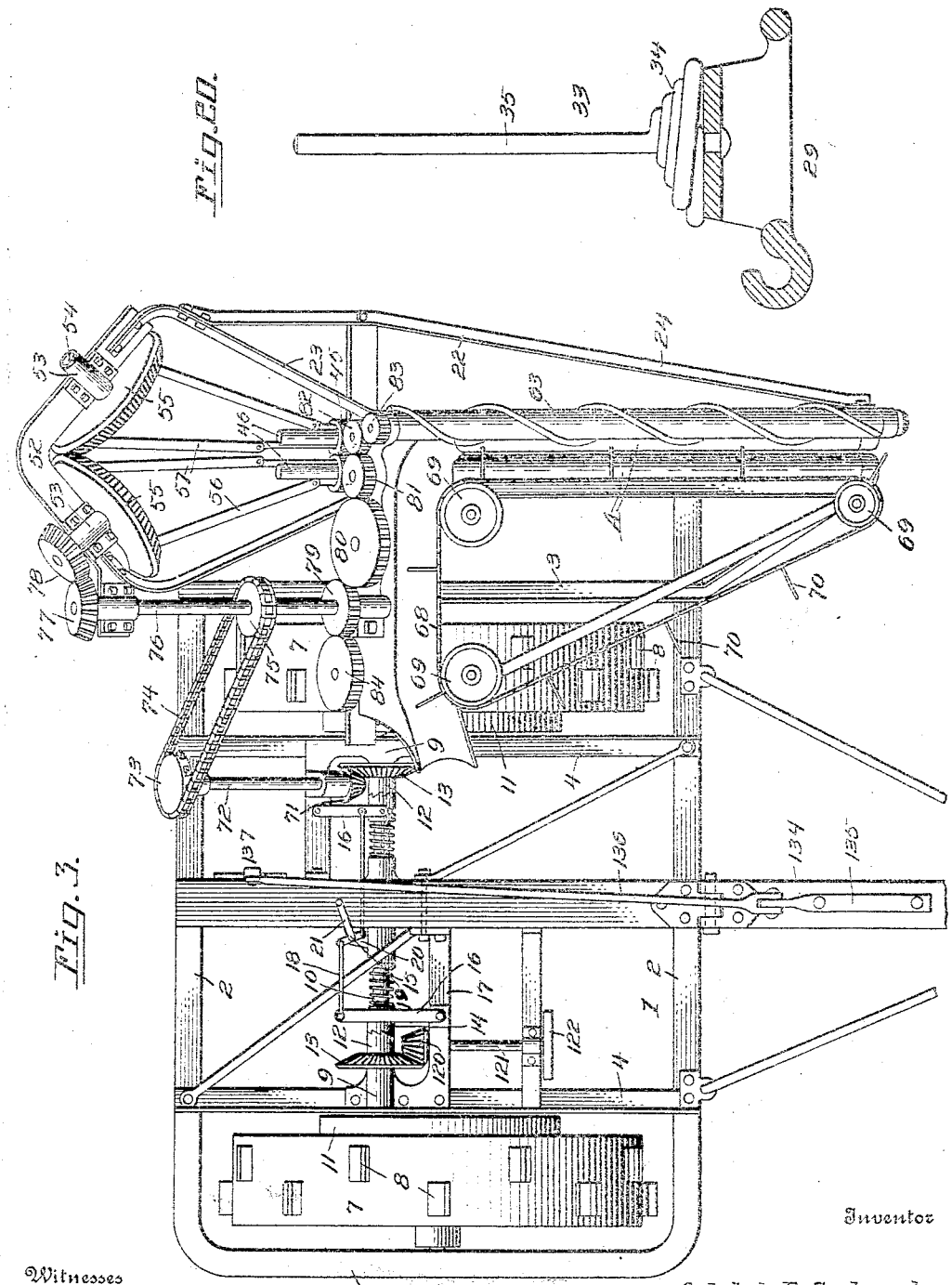

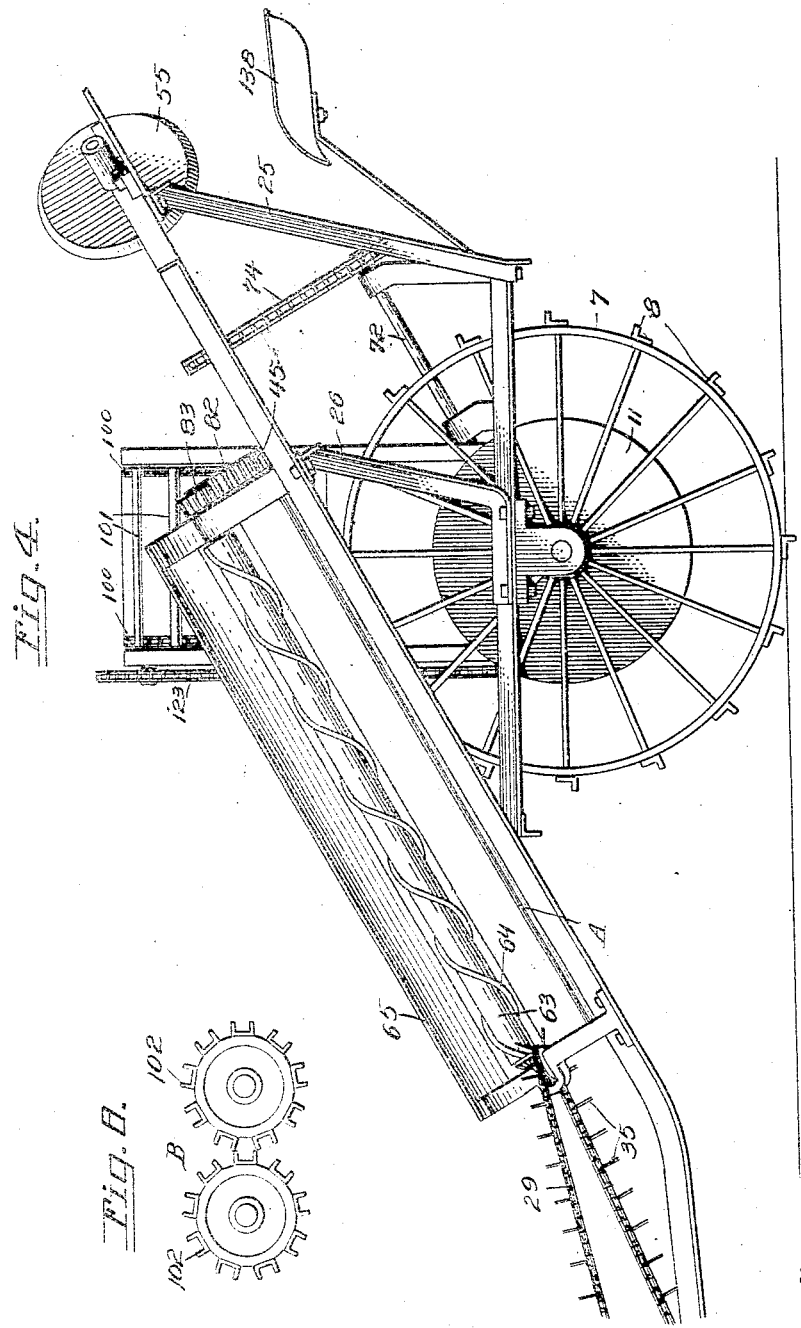

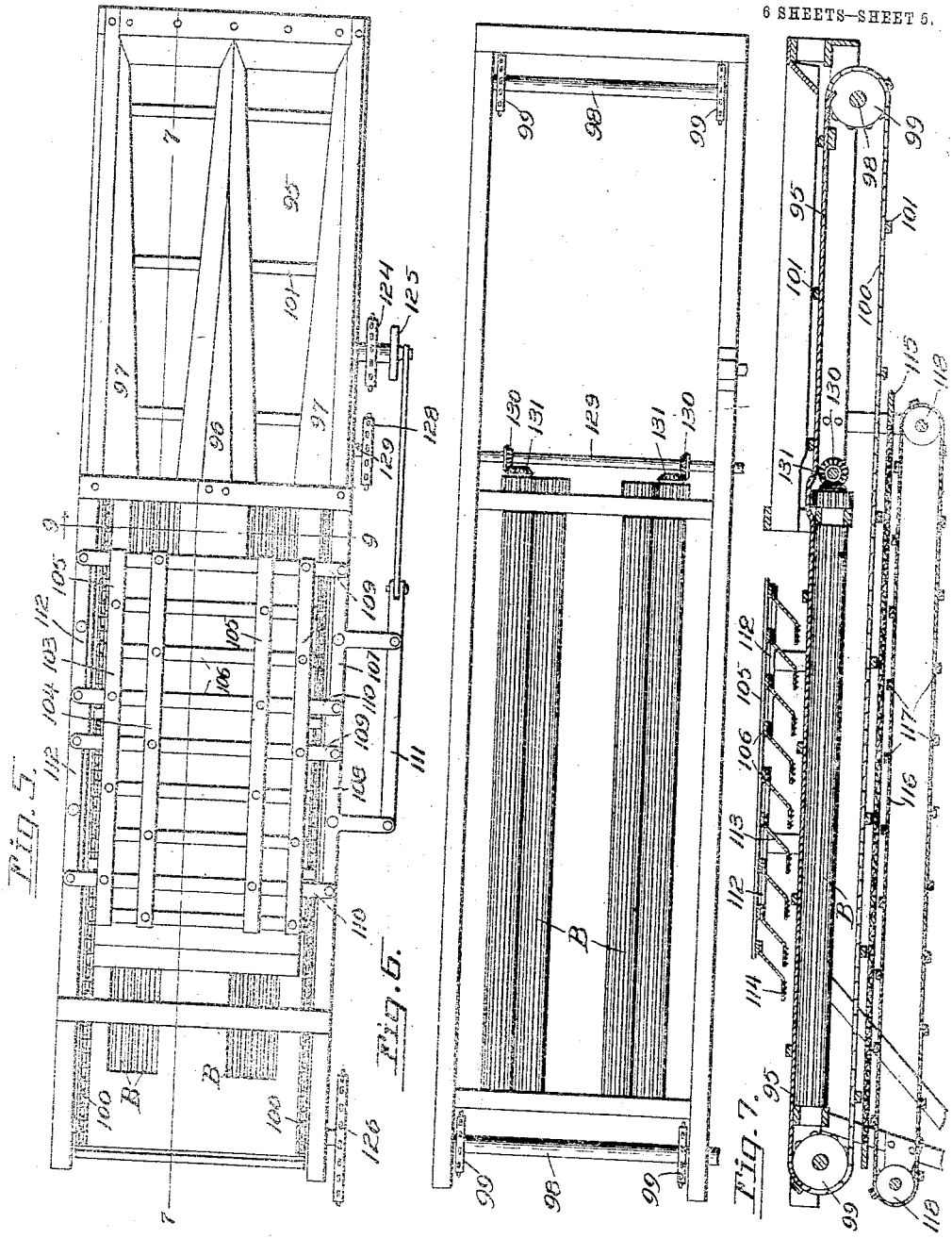

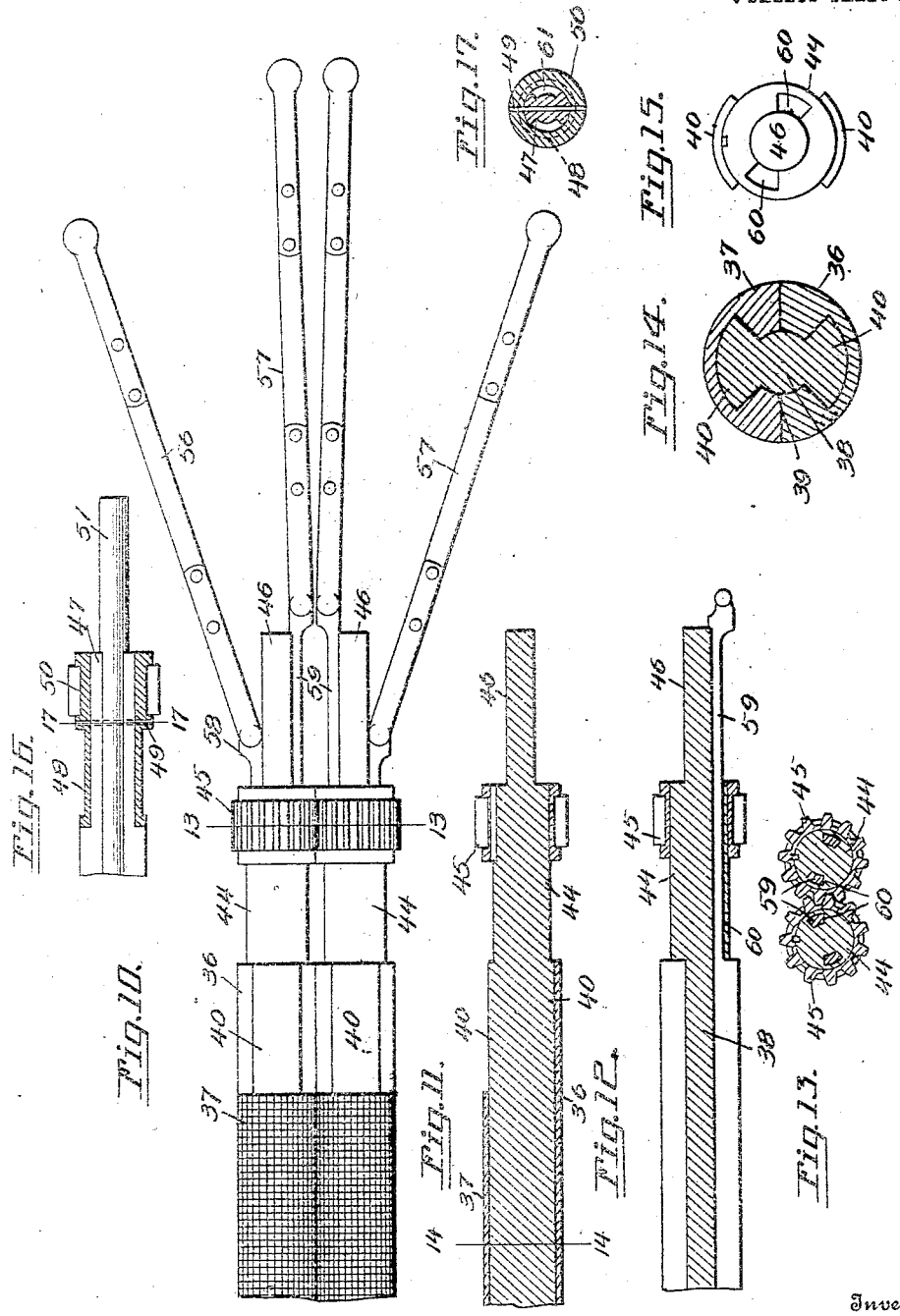

UNITED STATES PATENT OFFICE.

ADOLPH P. GUBRUD, OF HUDSON, SOUTH DAKOTA.

CORN HARVESTING AND HUSKING MACHINE.

1,056,665.   Specification of Letters Patent.   Patented Mar. 18, 1913.

Application filed February 29, 1908. Serial No. 418,537.

*To all whom it may concern:*

Be it known that I, ADOLPH P. GUBRUD, a citizen of the United States, residing at Hudson, in the county of Lincoln and State of South Dakota, have invented new and useful Improvements in Corn Harvesting and Husking Machines, of which the following is a specification.

The invention relates to an improvement in corn harvesting and husking machines, being particularly directed to a harvester designed to gather the standing corn stalks, snap the ears therefrom, and strip the husks from the ears during the travel of the harvester over the row of corn.

One of the main objects of the present invention is the production of snapping rolls so constructed and arranged that the corn stalks are automatically fed downwardly and rearwardly relative to the travel of the machine during the operation of the rolls, whereby a most effective feeding of the stalks for the proper snapping of the ears is provided.

Another object of the invention is the provision of gathering mechanism in the use of which the stalks are properly directed to the snapping rolls, and by means of which any loose ears or broken stalks within the range of the gatherer are taken up and properly delivered to the machine.

Another object of the invention is the provision of husk splitting means designed to affect the ear husks in a manner to provide for the more efficient operation of the husking rolls.

Another object of the invention is the provision of husking rolls constructed in the open-roll type, whereby grinding of the kernels accidentally stripped from the ears in the husking operation is avoided.

Another object of the invention is the provision of means whereby the kernels, which may be separated from the ears in the husking operation, are screened from the husks and delivered to an elevator with the husked ears.

With the above objects in view the invention consists in certain details of construction and combinations of parts which will be described in the following specification, with particular reference to the accompanying drawings, in which:—

Figure 1 is a plan view of a machine constructed in accordance with my invention. Fig. 2 is a front elevation of the same, the gathering mechanism and other adjacent parts being omitted. Fig. 3 is an enlarged plan of the machine with the gathering mechanism and husking mechanism omitted. Fig. 4 is a side elevation of the machine, the forward portion of the gathering mechanism being broken away. Fig. 5 is an enlarged plan of the husking mechanism. Fig. 6 is a similar view omitting the splitting means and feeding belt. Fig. 7 is a section on line 7—7 of Fig. 5. Fig. 8 is an enlarged end elevation of the husking rolls. Fig. 9 is a section on line 9—9 of Fig. 5. Fig. 10 is an enlarged plan of one end of the snapping rolls. Fig. 11 is a longitudinal section through one of the rolls. Fig. 12 is a longitudinal section taken centrally of one end of one of the rolls. Fig. 13 is a transverse section on line 13—13 of Fig. 10. Fig. 14 is an enlarged transverse section through one of the rolls on the line 14—14 of Fig. 11. Fig. 15 is an end elevation of one of the rolls. Fig. 16 is a broken longitudinal section showing a modified connection between one of the snapping rolls and the gear carried thereby. Fig. 17 is a section on line 17—17 of Fig. 16. Fig. 18 is an end elevation of the snapping rolls and adjacent parts. Fig. 19 is a plan of the lower or receiving end of the rolls illustrating particularly the positions of the respective roll sections in providing for the admission of a corn stalk between them. Fig. 20 is a sectional view partly in elevation illustrating the spring fingers for the gathering mechanism.

Referring particularly to the accompanying drawings, in which similar reference numerals indicate like parts throughout the several views, and wherein the preferred details of construction are illustrated, my improved corn picker and husker comprises a main frame 1 including side bars 2 and end bars 3, which frame is of approximately rectangular shape in plan and may be constructed of any desired material, though preferably of angle iron for desired rigidity and lightness. Adjacent each end bar 3, the side bars 2 are connected by cross bars 4 disposed in parallel relation to the end bars, all as clearly shown in Fig. 3. Depending from the end bars 3 and cross bars 4 are alined bearing boxes 5, in which is mounted the main axle 6, which preferably extends through all of said bearings. On this axle between each end bar and the adjacent cross bar is mounted a ground wheel 7, of any desired type, and preferably provided with a broad tread provided with plates or projections 8 to prevent slipping of the wheels in the operation of the machine.

Bearings 9 are secured upon the upper surfaces of the cross bars 4, in which is mounted the main power shaft 10. The terminals of the shaft extend beyond the bearings and are provided with gears to respectively mesh with and be driven by internal gears 11 carried on the drive wheels. On the power shaft adjacent each bearing 9 there is loosely mounted a sleeve 12 carrying a bevel gear 13, one of which gears constitutes the drive gear for the husking mechanism and coöperating parts while the other forms the drive gear for the gathering mechanism, snapping rolls, and coöperating parts. Keyed upon the power shaft for independent sliding movement adjacent each sleeve 12 is a clutch sleeve 14, the edge of which, and also the coöperating edge of the sleeve 12 is formed for interlocking engagement in any usual or preferred manner. The clutch sleeve 14 is normally held in operative engagement with the sleeve 12 through the medium of a coil spring 15 encircling the power shaft, and is manually retracted to free the gear 13 from the influence of the power shaft through the medium of a lever 16 terminally supported upon a frame strip 17 and engaged with the clutch sleeve intermediate its ends. The respective levers 16 are connected by links 18 to a turn lever 19 centrally mounted upon a bracket 20 and carrying a crank handle 21. By this construction the operation of the crank handle will withdraw the clutch sleeves from operative engagement with the gear sleeves or release said clutch sleeves to the influence of their setting springs at the will of the operator, the movement of the clutch sleeves in either direction being simultaneous.

The gathering mechanism and snapping rolls are mounted in an auxiliary frame 22 supported above and at an angle to the main frame. The auxiliary frame includes a rear section 23 of approximately triangular form and a forward frame 24 which extends in advance of the forward side bar 2 of the main frame. The auxiliary frame is supported by rear uprights 25 and center uprights 26, the former of which is of materially greater length than the latter so that the auxiliary frame is disposed at a forward and downward incline relative to the main frame.

The forward section 24 of the auxiliary frame is extended in advance of the main frame in the form of spaced bars 27 which for a portion of their length in advance of the main frame are extended in parallel relation, and for the remainder of their length diverge at 28 to provide a flaring entrance for the material, as will presently appear.

The gathering mechanism comprises duplicate sprocket chains 29, which at their forward ends are operative about sprocket wheels 30 and at their rear ends about sprocket wheels 31. Intermediate the wheels 30 and 31 are arranged sprocket wheels 32 serving as guides for the inner or feeding length of the sprocket chains. The respective sprocket wheels are arranged at an angle to the horizontal, so that the inner or feeding lengths are on a materially lower plane than the outer lengths. The sprocket 32 is preferably so arranged relative to the sprockets 30 and 31 as to cause the inner or feeding lengths of said chains to follow the form of the forward extensions of the auxiliary frame, that is the extreme forward ends of the chains, or of their feeding lengths, is disposed the maximum distance apart, from which said lengths gradually approach each other until engaging the sprockets 32, from which point they extend rearwardly to the sprockets 31 in approximately a parallel relation. The sprocket chains, which are independently driven in a manner to be later described are provided with picker fingers 33, more completely shown in Fig. 20. These fingers, of which there may be any desired number, are mounted for independent yielding, being constructed of spring material to provide a base 34 which is directly secured to the sprocket link and is in the form of spring convolutions. From the base projects the finger proper 35, which, by reason of the mounting described, is of a spring character and constructed to readily yield when meeting unyielding obstructions in the gathering operations.

The snapping rolls A, which are arranged in rear of the gathering mechanism and designed to receive the material directly from said mechanism, constitute one of the important features of the present invention. These rolls are constructed so as to automatically provide at determinate intervals for the formation of a space between them whereby the standing stalk may be admitted without lateral displacement of the rolls. These rolls are constructed primarily for two distinct movements, that is a revolving movement to feed the stalk downward between the rolls and a reciprocatory movement to feed the stalk longitudinally of the rolls toward the rear during the travel of the machine. These rolls are of identical structure, and a detailed description of one will suffice for both. The construction of the rolls is more particularly illustrated in Figs. 10 to 17 inclusive, by reference to which it will be seen that each roll is constructed of duplicate sections 36 and 37, each of semicylindrical form in cross section and disposed with their plane surfaces in contact. A key 38 passes centrally through both sections in assembled form, said key comprising a central approximately cylindrical portion 39 and flaring or chord-shaped wings 40. By means of this key, which is more particularly shown in Fig. 14, it is obvious that the respective sections of the roll are mounted for independent longitudinal movement but are compelled to rotate together as a single roll. The forward or lower ends of the snapping rolls are mounted in bearings 41, the forward ends of which are formed or provided with divergent horns 42 to form a flaring entrance opening. The rolls are supported in the bearing preferably by projecting the key 38 beyond the roll sections in the form of a shaft, as shown in dotted lines at 43 in Fig. 19. At the rear or upper ends of the rolls the keys 38 are extended beyond the section ends and formed to provide shaft extensions 44, which are mounted in suitably supported bearings carried by the auxiliary frame. The extreme upper ends of the shaft extensions 44 are provided with intermeshing gears 45 keyed upon said extensions and coöperating to impart a steady, even, and simultaneous movement to the rolls. Beyond the shaft extension 44 the key is further reduced circumferentially to provide a guide 46, for a purpose which will presently appear.

In Figs. 16 and 17 I have shown a slightly modified construction of the key extension, in which modification said key is reduced in sectional dimensions to provide an extension 47 similar in sectional form to the main length of the key. A bearing sleeve 48 is adapted to be passed longitudinally over the key extension 47, and be secured thereon by a transverse pin 49. The outer end of the bearing sleeve 48 is formed in casting to provide a gear 50, corresponding to the gear 45. Beyond the gear 50 the key extension 47 is projected to form a guide 51 corresponding to the guide 46.

The rear section of the auxiliary frame is disposed beyond the upper or rear ends of the snapping rolls, and the rear bar of said frame is in the form of angularly related lengths 52. Each of these portions 52 are provided with bearings 53 to receive stub shafts 54 on the forward ends of which, and thus within the portion 23 of the auxiliary frame, are arranged bevel gears 55, one for each of the snapping rolls. By virtue of the angular relation of the lengths 52 of the rear bar the bevel gears 55 are thus disposed at an angle to each other, with their teeth intermeshing to transmit motion from one to the other. Each gear 55 is connected to one roll, the medium of connection being independent pitmen 56 and 57, which are connected at their forward ends to extensions 58 and 59 leading from the respective sections 36 and 37 of the snapping roll. The extensions 58 and 59, pass through openings 60 in the shaft extension 44 of the key, in the preferred form, and in the modified form between the shell of the bearing sleeve 48 and the body of the key 47, as at 61. The extensions 58 and 59 operate on opposite sides of the guide 46, said guide being grooved if desired for the reception of the extensions. The rear or gear end of the pitmen are connected at diametrically opposite points of the particular gear 55, and by virtue of this connection and the angular relation of the gear to the longitudinal plane of the roll, it is at once obvious that the revolution of the gear will cause a continuous and respectively reverse reciprocation of the respective roll sections, that is while one section is traveling in one direction the other section will be traveling in the reverse direction.

As by the gears 45 the snapping rolls are continuously revolved, and by the gears 55 the roll sections are continuously reciprocated in opposite direction, it is apparent that each roll is given in effect a continuous rotary and reciprocatory movement. In connection with the construction, however, it is to be noted that the relatively inner edges of the gears 55 are the greatest distance from the snapping rolls, and that, therefore, the section of the roll connected to that part of the gear 55 which may at the particular moment be innermost, will be in the fully retracted or rearwardly projected position. As these sections of the respective rolls are always the sections in engagement with each other, that is the innermost sections, it is obvious that the sections engaging with the stalk are always moving rearward, said sections, of course, moving forward when they are the outermost or non-stalk-engaging sections.

Another important object is gained by the relative reciprocation of the sections in the operation of the machine, that is providing for the passage of the stalks between the rolls without particular feeding mechanism for such passage or separating the rolls for such purpose. This function is more particularly illustrated in Fig. 19 of the drawings, from which it will be obvious that in a certain position of the rolls, as for example when the line of division of the sections of the rolls is disposed at an angle approximating 45 degrees, and the respective sections 36 and 37 separated at approximately their limits of longitudinal movement, the distance between the immediately adjacent points of the uppermost sections, as 36, will be equal to the combined transverse extent of those portions of the remaining section, as 37, which lie between the relatively nearest portions of the sections 36.

This space is free of obstruction and affords a clear passage for the entrance of the corn stalk. As the rolls revolve the proximate points of the sections 36 will, of course, approach and grip the stalk. It is, therefore, apparent that in the snapping rolls, constructed in accordance with this invention, three distinct and important advantages follow from the sectional formation of the rolls and the opposite movements of such sections, namely the close association of the rolls in feeding the stalks downward between the rolls to snap the ends therefrom; in feeding the stalk continuously toward the rear ends of the rolls during the travel of the stalk downwardly between the rolls, and automatically providing at determinate intervals a space between the gripping surfaces of the rolls greatly in excess of the normal to provide for and insure the proper entrance of the stalk between the rolls.

The bearings for one of the rolls are preferably supported on spring pressed or otherwise yieldingly mounted studs 62 in order to permit a lateral yielding of one of the rolls relative to the other in the event such is necessary. A feeding roller 63 is mounted above and slightly to one side of one of the snapping rolls, said roller extending longitudinally in parallel relation to the snapping rolls and being provided with a surface arranged spirally wound rod or wire 64 for assisting in the rearward feeding of the material. Guide boards 64—65 are supported on opposite sides of and above the snapping rolls to prevent lateral bending or breaking of the stalks in the operation of the machine, these guides preferably extending throughout the length of the snapping rolls and one of them, as 65, arranged above the feeding roll 63 is coextensive in length with the length of said roll, which latter extends rearwardly beyond the rear or inner ends of the snapping rolls.

At the upper or rear end of the snapping rolls is supported a guide trough 66, preferably a concaved strip of metal having an edge flange 67 by which it may be supported from a suitable adjacent frame strip. The trough is approximately of L-form, one end of which overlies and rests in close proximity to the rear ends of the snapping rolls, from which the guide trough extends rearwardly for a short distance and then laterally terminating approximately above the adjacent cross bar 4 of the main frame. A conveyer, in the form of a chain 68, is mounted for coöperation with the snapping rolls and with the feed trough 66, being supported on sprockets 69 mounted respectively at the forward end of the snapping rolls, at the rear end thereof, and at the delivery end of the trough, as clearly shown in Fig. 3. The chain is provided with a series of contact plates 70 arranged at intervals throughout the length of the chain, so that in the travel of the chain said plates will sweep the surface of the snapping rolls and through the conveyer trough, thereby forcing the ears of corn snapped from the stalks by the rolls into and through the trough to the husking apparatus to be later described.

The gathering mechanism, snapping rolls, and coöperating parts, previously described, are operated directly from one of the gears 13 on the power shaft 10, for which purpose said gear engages a bevel gear 71 fixed on a drive shaft 72 mounted in the frame and carrying at its opposite end a sprocket wheel 73. The wheel 73 is connected by a chain 74 with a sprocket 75 fixed upon a shaft 76 mounted in bearings adjacent the snapping rolls. The rear end of the shaft 76 is provided with a gear 77 arranged to mesh with a gear 78 upon the adjacent stub shaft 54 of one of the snapping roll controlling gears 55, whereby a continuous movement is imparted to said gears 55. The forward end of the shaft 76 is provided with a gear 79 arranged in mesh with an idler 80 in turn driving a gear 81 meshing with one of the gears 45 of the adjacent snapping roll and also with a gear 82 meshing with the gear 45 of the other snapping roll. The gear 82 also meshes with and drives a gear 83 fixed on the proximate end of the feeding roll 63. By the disposition of the gears 81 and 82, it is obvious that the snapping rolls will be continuously driven even should they be temporarily separated for any cause a sufficient distance to disconnect their gears 45. The gear 79 also meshes, in opposition to the gear 80 with a gear 84 fixed on the rear end of a shaft 85 mounted in the frame-work and carrying at its forward end a bevel gear 86 arranged to engage a bevel gear 87 carried on the lower end of a vertically extending shaft 88 on the upper end of which is carried the sprocket 69 for the conveyer chain, which is arranged adjacent the delivery end of the trough. One of the chains of the gathering mechanism is driven directly from the forward conveyer sprocket 69 by extending the shaft of said sprocket and connecting it by a knuckle joint 89 with the shaft 90 of the rear sprocket 31 of the gathering chain. The other chain is driven through the medium of a bevel gear 91 carried on the upper end of the shaft of the rear sprocket 31 with a bevel gear 92 carried on the lower or relatively forward end of the feed roll 63.

The parts thus described relate particularly to the harvesting or picking of the corn and the delivery of the same beyond such mechanism. To combine with such mechanism I have arranged husking devices which I will now describe.

The husking devices are mounted on an auxiliary frame 93, supported above the main frame by uprights 94, said auxiliary frame being arranged at right angles to the projection of the auxiliary frame 22 or in other words at right angles to the direction of travel of the machine in operation. The frame is inclined so that its innermost end is lowest, said end being preferably connected to the center upright 26 of the auxiliary frame 22, so that the lowermost end of the husking frame is immediately adjacent and slightly beneath the delivery end of the trough 66. The husking frame is provided at its rear or inner end with a platform 95 arranged to underlie the delivery end of the trough 66 and directly receive the ears of corn forced from said trough. Centrally and longitudinally of the platform extends a deflecting abutment 96, which at the end adjacent the trough terminates in an edge, from which it gradually increases in width or diverges until at the end of the platform remote from the trough the abutment is of greatest width. The sides of the platform are also provided with deflecting walls 97 reversely arranged with respect to the angular disposition of the adjacent face of the abutment, so that at the end of the platform remote from the trough 66 the passage on the opposite sides of the abutment is of the least width.

Shafts 98 are mounted transversely of the husking frame at the respective ends of the latter, on the ends of which shafts within the frame are fixed sprockets 99. The respectively alined sprockets are connected by chains 100, and the respective chains are bridged by push bars 101 adapted to travel longitudinally of the platform and husking frame. The push bars are thus adapted to receive and feed the ears of corn longitudinally of the husking frame in an obvious manner.

Within the husking frame and beyond the platform 95 are arranged the husking rolls B. These rolls are in duplicate pairs, longitudinally alined with the spaces between the wall 97 and the proximate face of the abutment 96 above the platform. The abutment and wall noted are thus arranged to aline the ears of corn traveling therethrough and deliver them with certainty and precision to the husking rolls.

The husking rolls are of the same type, and for a purpose which will presently appear I prefer the type illustrated more particularly in Fig. 8. In this form the rolls or the cylindrical body are provided with a series of U-shaped ribs 102 opening upward and extending longitudinally of the body. The respective rolls of each pair are so arranged that the ribs 102, which are the husking teeth, interfit in the operation of the rolls, as shown in the drawings. Arranged above the husking rolls is what I term a husk splitting mechanism comprising frames 103 and 104, each including longitudinal bars 105 connected by cross bars 106. The frames are interfitted, that is the cross bars of one frame alternate with the cross bars of the other, and this being equally true with the longitudinal bars. Mounted upon one of the longitudinal bars of the husking frame are T-shaped levers 107 and 108, pivoted at the center of their main arm, with the short arm projecting beyond the frame bar. The levers 107 and 108 are arranged in alinement, the rear ends of said levers being connected by links 109 to one of the frames, as 103, the forward ends of the levers being connected by links 110 to the remaining frame, as 104. By this means simultaneous operation of the levers 107 and 108 in the same direction will cause relatively reverse reciprocatory movements of the respective frames 103 and 104. The levers 107 and 108 are connected by a bar 111 connecting their short arms, and bar levers 112 are mounted in the opposite frame bar of the husking frame to guide the frames 103 and 104 in operation.

Secured to the respective frames 103 and 104 are splitting members 113 comprising approximately Z-shaped spring strips secured at their upper ends to the frame bars and at their lower ends projecting in parallel relation to and above the husking rolls. The lower surfaces of the relatively forward or lower ends of the members 113 are roughened or provided with teeth 114, so that in the opposite movements of the frames 103 and 104 the teeth of the splitting members carried by said frames will engage the husks of the ears of corn resting on the husking rollers and tend to split and separate the material of the husks. Provision is thus made for the effective gripping of the husked material by the teeth 102 of the husking rolls.

It being understood that in the husking operation more or less of the kernels will be torn from the ears, provision should be made for saving such material. It is with this object in view that the teeth of the husking rolls are formed of the open or hollow type, as by such construction the possibility of grinding any such detached kernels in their passage through the husking rolls is reduced to a minimum, and such material is delivered with the husks below the rolls. To recover such material I arrange below the rolls a screen 115, of such size and mesh as to permit the passage of the material therethrough and prevent the passage of the husks. The screen is so arranged that the lower lengths of the chains 100 will sweep directly above the screen, so that the cross bars 101 will force the husks lengthwise the screen and beyond the same, thus permitting the kernels of corn to pass through the screen. Below the screen I arrange a conveyer belt 116 having cross bars 117, on which belt the kernels fall after passage through the screen, this belt being mounted for movement over rollers 118 arranged beyond the respective ends of the screen. The relatively forward end of the conveyer belt 116 terminates beyond and above the lower end of an elevator 119, which may be of any approved construction and is adapted to deliver the husked ears to a wagon body or other convenient receptacle. As the feed belt composed of the chains 100 and bars 101 operates above the conveyer 116, it is obvious that said feed belt will also force the ears of corn into the elevator, so that said husked ears and also any kernels which may be stripped therefrom by the husking rolls will find their way into the elevator for delivery to the storage or transportation receptacle.

The husking mechanism described is driven from the remaining gear 13, which in this instance meshes with a bevel gear 120 fixed on the inner end of a shaft 121, carrying at its outer end a sprocket 122. The drive chain 123 engages the sprocket 122 and passes over a sprocket 124 mounted on the husking frame, the shaft of which sprocket is provided with a crank wheel 125. From the sprocket 124 the chain 123 passes laterally and around a sprocket 126 which is directly connected to the forward shaft 98 of the feeding belt, said chain passing then around a sprocket 127 for operating the elevator, thence laterally and around a sprocket 128 secured on the end of a shaft 129 arranged transverse of the husking frame and carrying bevel gears 130 to mesh with bevel gears 131 on one of each pair of husking rolls, whereby to impart necessary movement to said rolls. From the sprocket 128 the chain passes over a sprocket 132 connected to the relatively rear roller 118 for the conveyer 116. The engagement of the sprocket wheels with the chain is of course arranged to impart movement in the proper direction to said wheels, as will be obvious from Fig. 2 of the drawings.

The main beam 133 extends transverse the main frame, having movably connected to its forward end the tongue or draft beam 134. Through this connection provision is made for adjusting the height of the operative parts of the machine, preferably through the medium of a bracket 135 extending vertically from the tongue 134 and connected at its upper end by a bar 136 with a manually operable lever 137 arranged near the seat 138 of the operator. By this construction the height of the forward end of the gathering mechanism may be adjusted in accordance with the results desired or with the character of the soil over which the machine is operating.

One of each pair of husking rolls is mounted for independent lateral movement relative to the other, for which purpose the journal of the particular roll is mounted in movable bearings 139 which are normally positioned by springs 140 to secure proper engagement of the rolls. This construction permits a yielding of the rolls to increase the distance between them in the event such becomes necessary during the husking operation, the excess space being immediately taken up by the springs after the passage of the obstruction.

Assuming the parts constructed and arranged as described, the operation of my improved corn picking and husking apparatus is as follows: The machine is driven lengthwise of the field so that the forward ends of the gathering chains straddle the row being operated upon. By means of the gathering mechanism the stalk is delivered in the further forward travel of the machine to the snapping rolls, the movement of the sections of said rolls, as previously described, making provision for the entrance of the stalk between them. The stalk thus delivered to the rolls is forced downward between the rolls and at the same time rearwardly thereof, thus effectively snapping the ears from the stalk. The disposition of the gathering mechanism is such that any broken stalks or loose ears which are on the ground within range of the forward end of said mechanism will be picked up and delivered to the snapping rolls, thus materially increasing the efficiency of the machine in the harvesting of the material. The ears snapped from the stalks are forced longitudinally of the snapping rolls and through the trough 66 by the conveyer chain 68, being delivered from the trough onto the platform 95 of the husking apparatus. The feed chains force the ears of corn longitudinally of the platform and to the husking rolls, in which position they are engaged and operated upon by the splitting mechanism and husked, as previously described. The husked corn, and any kernels which may find their way between the husking rolls, are delivered to the elevator 119, from which they may be conveyed to any suitable receptacle such as a wagon box traveling alongside the machine.

The important features of the present invention reside in the gathering mechanism, the snapping rolls, the husk splitting means, the husking rolls, and the conveyer for the separated kernels of corn that may pass between said rolls. In connection with these salient points of the invention I have described the preferred construction of each and also the preferred means of operation, but it is to be understood that such description is intended as an illustration of the generic principle involved, and that I contemplate, as within the spirit of the present invention any variations or modifications of the described constructions that may fall within the scope of the appended claims.

Having thus described the invention what is claimed as new, is:—

1. In a harvesting machine, coöperating rotary, sectional snapping rolls, and means for reciprocating adjacent portions of the rolls in the same direction longitudinally.

2. In a harvesting machine, coöperating sectional snapping rolls arranged in substantial parallelism and means for imparting a rotary movement to the rolls, and longitudinal reciprocatory movement to the respective sections of each roll.

3. In a harvesting machine, coöperating snapping rolls, each having sections longitudinally movable, certain of the sections of the rolls coöperating when in adjacency.

4. In a harvesting machine, coöperating rotary snapping rolls each having sections relatively longitudinally movable, certain of the sections of the rolls coöperating when in adjacency.

5. In a harvesting machine, coöperating snapping rolls each having sections relatively longitudinally movable, certain of the sections of the rolls coöperating when in adjacency, and means for relatively reciprocating the sections of each roll.

6. In a harvesting machine, coöperating snapping rolls each having relatively reciprocative elements, and means for reciprocating adjacent elements of the rolls in the same direction.

7. In a harvesting machine coöperating snapping rolls and means for reciprocating adjacent portions of said rolls in the same direction.

8. In a harvesting machine coöperating snapping rolls made up of sections, means for oppositely reciprocating the sections of each roll, said means being arranged to reciprocate the adjacent sections of both rolls in the same direction.

9. In a harvesting machine coöperating snapping rolls arranged for rotation, and means for constantly operating adjacent portions of said rolls in a direction longitudinally of the rolls.

10. In a harvesting machine coöperating snapping rolls, each of said rolls comprising longitudinal sections and a key connecting the sections to permit their relative longitudinal movement.

11. In a harvesting machine sectional snapping rolls arranged in substantial parallelism, means for supporting the rolls, and means adapted in operation to impart a rotary movement to the rolls and an opposite reciprocatory movement to the respective sections of each roll.

12. In a harvesting machine coöperating sectional snapping rolls arranged in substantial parallelism, means for supporting the rolls, and operating means adapted to simultaneously impart opposite rotary movement to the rolls and opposite reciprocatory movement to the respective sections of each roll.

13. In a harvesting machine coöperating sectional snapping rolls arranged in substantial parallelism, means for supporting the rolls, and operating means adapted to simultaneously impart opposite rotary movement to the rolls and opposite reciprocatory movement to the respective sections of each roll, said operating means moving the relatively adjacent sections of the respective rolls rearwardly in the same direction, whereby to provide a space between the relatively remote sections of the respective rolls beyond the ends of the adjacent sections and exceeding the normal space between the rolls.

14. In a harvesting machine, coöperating snapping rolls each having sections mounted for relative longitudinal movement, and means for imparting opposite movements to the sections of each roll.

15. In a harvesting machine, coöperating snapping rolls, each having sections mounted for relative longitudinal movement, and a driven gear connected at diametrically opposite points with the respective sections of each roll, said gears operating at an angle to the sections of the respective rolls whereby to oppositely reciprocate the sections of each roll.

16. In a harvesting machine a plurality of coöperating snapping rolls adapted for rotation and having sections arranged for reciprocation, and gathering mechanism operating in advance of the rolls and arranged to deliver the material to the rolls.

17. In a harvesting machine, coöperating snapping rolls, each having sections mounted for relative longitudinal movement, and a driven gear connected at diametrically opposite points with the respective sections of each roll, said gears operating at an angle to their respective rolls and at an angle to each other whereby to oppositely reciprocate the sections of each roll and correspondingly reciprocate the adjacent sections of the two rolls.

18. A harvester including a coöperative pair of snapping rolls, each roll having opposite longitudinally movable sections, and means for moving the sections of each roll relatively to each other.

19. Snapping rolls for harvesters each including opposite longitudinally movable sections, and means for simultaneously revolving the rolls and reciprocating the respective sections of each roll.

20. In a harvester, coöperating snapping rolls, each of said rolls having a rotatable central section and sections mounted thereon for rotation therewith and relatively movable longitudinally thereof.

21. In a harvester, coöperating snapping rolls, each of said rolls having a rotatable central section, sections mounted thereon for rotation therewith, and means for relatively reciprocating the sections of each roll.

22. In a harvester, coöperating snapping rolls, each of said rolls having relatively movable substantially semi-cylindrical sections disposed with their chordal sides abutting, and means for relatively reciprocating the sections of each roll.

23. In a harvester, coöperating snapping rolls, each of said rolls having relatively movable substantially semi-cylindrical sections disposed with their chordal sides abutting, and means for relatively reciprocating the sections of each roll, the sections of the respective rolls being arranged to coöperate when in adjacency.

24. In a harvester, coöperating snapping rolls, each of said rolls having a rotatable central section, and substantially semi-cylindrical sections mounted thereon for rotation therewith and disposed with their chordal sides next to each other, the said sections inclosing the first mentioned sections, and means for relatively reciprocating the last mentioned sections of each roll.

25. In a harvester, coöperating snapping rolls, each of said rolls having a rotatable central section and sections mounted thereon for rotation therewith and relatively movable longitudinally thereof, the said sections extending lengthwise of the central section.

26. In a harvester, coöperating rotary sectional snapping rolls, and means for moving adjacent portions of the rolls rearwardly while in coöperative relation and for moving non-adjacent portions of the rolls forwardly.

In testimony whereof I affix my signature in presence of two witnesses.

ADOLPH P. GUBRUD.

Witnesses:
D. W. GOULD,
K. ALLEN.

Copies of this patent may be obtained for five cents each, by addressing the "Commissioner of Patents, Washington, D. C."